US011736525B1

(12) United States Patent
Rungta et al.

(10) Patent No.: US 11,736,525 B1
(45) Date of Patent: Aug. 22, 2023

(54) GENERATING ACCESS CONTROL POLICIES USING STATIC ANALYSIS

(71) Applicant: Amazon Technologies, Inc., Seattle, WA (US)

(72) Inventors: Neha Rungta, San Jose, CA (US); Willem Conradie Visser, Los Gatos, CA (US); Daniel George Peebles, Richland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 275 days.

(21) Appl. No.: 16/904,467

(22) Filed: Jun. 17, 2020

(51) Int. Cl.
*H04L 9/40* (2022.01)
*G06F 21/57* (2013.01)
*G06F 21/62* (2013.01)
*H04L 41/0893* (2022.01)

(52) U.S. Cl.
CPC .......... *H04L 63/20* (2013.01); *G06F 21/577* (2013.01); *G06F 21/6218* (2013.01); *H04L 41/0893* (2013.01); *H04L 63/10* (2013.01)

(58) Field of Classification Search
CPC .............. G06F 21/577; G06F 21/6218; H04L 41/0893; H04L 63/10
See application file for complete search history.

(56) References Cited

U.S. PATENT DOCUMENTS

| | | | |
|---|---|---|---|
| 7,398,308 B2 | 7/2008 | Friedel et al. | |
| 7,490,072 B1 * | 2/2009 | Cowan | G06F 21/6218 706/14 |
| 7,685,632 B2 | 3/2010 | Vayman | |
| 7,904,956 B2 | 3/2011 | Golan et al. | |
| 8,381,242 B2 * | 2/2013 | Berg | G06F 21/577 725/25 |
| 8,402,514 B1 | 3/2013 | Thompson et al. | |
| 8,499,353 B2 | 7/2013 | Lockhart et al. | |

(Continued)

OTHER PUBLICATIONS

Sven Lachmund, "Auto-generating access control policies for applications by static analysis with user input recognition," SESS '10: Proceedings of the 2010 ICSE Workshop on Software Engineering for Secure Systems, May 2010, pp. 1-7.

(Continued)

*Primary Examiner* — Jason Chiang
(74) *Attorney, Agent, or Firm* — Robert C. Kowert; Kowert, Hood, Munyon, Rankin & Goetzel, P.C.

(57) ABSTRACT

Methods, systems, and computer-readable media for generating access control policies using static analysis are disclosed. An access control policy generator performs static analysis of program code of a software product. The static analysis identifies one or more calls to one or more external components in the program code. The access control policy generator determines a mapping of the one or more calls to one or more actions. The one or more actions are selected from a plurality of known actions supported by an access control policy manager. The access control policy generator generates an access control policy associated with the software product. The access control policy comprises one or more permissions with respect to the one or more external components. The access control policy permits the software product to access the plurality of external components using the access control policy manager during execution of the software product.

20 Claims, 7 Drawing Sheets

(56) References Cited

U.S. PATENT DOCUMENTS

| | | | |
|---|---|---|---|
| 8,931,103 B2* | 1/2015 | Deakin | G06F 21/6218 |
| | | | 717/124 |
| 8,955,038 B2 | 2/2015 | Nicodemus et al. | |
| 8,978,106 B2* | 3/2015 | Swamy | G06F 21/629 |
| | | | 726/4 |
| 9,264,449 B1* | 2/2016 | Roth | H04L 63/102 |
| 9,521,167 B2* | 12/2016 | Martherus | H04L 63/10 |
| 9,665,733 B1 | 5/2017 | Sills et al. | |
| 9,785,777 B2 | 10/2017 | Sharma et al. | |
| 9,892,279 B2 | 2/2018 | Petkovic et al. | |
| 9,923,918 B2 | 3/2018 | Nicodemus et al. | |
| 10,031,748 B2* | 7/2018 | Sturtevant | G06F 8/72 |
| 10,122,757 B1 | 11/2018 | Kruse et al. | |
| 10,467,423 B1* | 11/2019 | McClintock | G06F 21/6218 |
| 10,609,041 B1* | 3/2020 | Wilczynski | G06F 21/62 |
| 10,963,565 B1* | 3/2021 | Xu | G06F 21/55 |
| 11,218,507 B2* | 1/2022 | Majaniemi | G06F 9/468 |
| 11,301,357 B1* | 4/2022 | Gacek | G06F 11/3608 |
| 2006/0143704 A1* | 6/2006 | Rits | G06F 21/629 |
| | | | 726/17 |
| 2008/0168527 A1* | 7/2008 | Koved | G06F 21/33 |
| | | | 726/1 |
| 2008/0282354 A1* | 11/2008 | Wobber | G06F 21/6218 |
| | | | 726/26 |
| 2010/0043048 A1* | 2/2010 | Dolby | G06F 21/57 |
| | | | 726/1 |
| 2010/0050161 A1* | 2/2010 | Nir-Buchbinder | |
| | | | G06F 9/44589 |
| | | | 717/126 |
| 2011/0126282 A1* | 5/2011 | Centonze | G06F 21/51 |
| | | | 726/21 |
| 2015/0242629 A1* | 8/2015 | Lindo | G06F 21/53 |
| | | | 726/1 |
| 2016/0232370 A1* | 8/2016 | Rissanen | G06F 8/38 |
| 2017/0177324 A1* | 6/2017 | Frank | G06F 9/44536 |
| 2020/0133744 A1* | 4/2020 | MacLeod | G06F 9/54 |
| 2020/0342094 A1* | 10/2020 | Agarwal | G06F 21/604 |
| 2021/0306338 A1* | 9/2021 | Miriyala | G06F 21/6209 |
| 2021/0314322 A1* | 10/2021 | Zhang | G06F 21/6218 |
| 2021/0367928 A1* | 11/2021 | Azulay | H04L 67/2814 |

OTHER PUBLICATIONS

U.S. Appl. No. 16/453,931, filed Jun. 26, 2019, Jacob A. Kjelstrup et al.

* cited by examiner

GENERATING ACCESS CONTROL POLICIES USING STATIC ANALYSIS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. Examples of such systems include online merchants, internet service providers, corporate networks, cloud computing services, web-based hosting services, and so on. Distributed systems may place a high importance on security of user access to system resources using appropriate permissions. Resource owners and resource administrators often use such access control policies to control access by users to computing resources in order to support the requirements of resource owners, administrators, and users. Defining and maintaining user roles, permissions, or policies can grow increasingly complex, particularly as the size and/or complexity of the system or the number of computer system users increases.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for generating access control policies using static analysis are described. Software products (e.g., services or applications) may be executed in a distributed system, service-oriented system, or provider network that includes a variety of resources and other services. To permit or deny access to such resources and services, the distributed system may enforce access control policies. Using prior approaches for access control policy management, access control policies were manually written by developers of applications or security experts, typically early in the application's lifecycle. Such manual techniques may be time-consuming, e.g., with developers often needing to refine access control policies using a trial-and-error approach while researching documentation about accessed resources and services. As another example, delays in development may occur if requests for policies are submitted to external teams that are not immediately available to perform the requested tasks. Additionally, such manual techniques may be prone to error, e.g., by granting insufficient access and thus hindering the performance of the application or by granting overly broad access and thus posing a security risk. Manually written policies may also become outdated as the needs of the application change or as the accessed services and resources change.

The aforementioned challenges, among others, are addressed by embodiments of the techniques described herein, whereby automated techniques may be used to generate access control policies using static analysis of program code. The program code for an application, service, or other software product may be analyzed prior to deployment of that code to a distributed system such as a cloud-based, multi-tenant provider network. Without needing to execute the application, the static analysis may identify access requests to external components (e.g., other software products, services, or resources) in the program code. The provider network may implement an access control policy manager that enforces access control policies to permit or deny access to such components. To automatically generate an access control policy for the application based (at least in part) on the static analysis, an access control policy generator may automatically map the access requests to actions that are known by the access control policy manager. For example, one of the known actions may represent putting an object in a storage bucket offered by an internet-accessible storage service. The access control policy generator may identify a service call to store an object using the storage service and then map that service call to the "put object" action. The access control policy generator may then generate an access control policy for the application that represents permission for the application to perform the "put object" action.

Using these techniques, the access control policy generator may generate an access control policy for a software product that represents permission to access one or more external components (e.g., other software products, services, or resources) in a provider network or other service-oriented system. In some embodiments, access control policies may be generated for individual users or user groups associated with the software product (e.g., owners or developers that expect to execute the software product). In some circumstances, access control policies may include placeholders for resource identifiers, and the placeholders may be completed automatically based (at least in part) on user input solicited by the access control policy generator or completed manually by developers. Access control policies generated based (at least in part) on static analysis may include permissions for little-used code paths that might be missed by runtime analysis. Access control policies generated based (at least in part) on static analysis may adhere to the principle of least privilege. By automatically generating application permissions using static analysis, developers and policy managers need not spend time and resources to manually write access control policies. Policies may be scoped appropriately for the actual needs of applications, and application development need not be delayed by a time-consuming trial-and-error process or while waiting for external teams to write or update policies.

As one skilled in the art will appreciate in light of this disclosure, embodiments may be capable of achieving certain technical advantages, including some or all of the following: (1) improving the security of a distributed system by automatically generating new access control policies that are appropriately scoped for the needs of particular applications based on static analysis of application program code; (2) improving the security of a distributed system by automatically restricting existing access control policies based on based on static analysis of application program code; (3) improving the speed of application development using automatic generation of access control policies that are used by developers to test applications; and so on.

Figure 1:
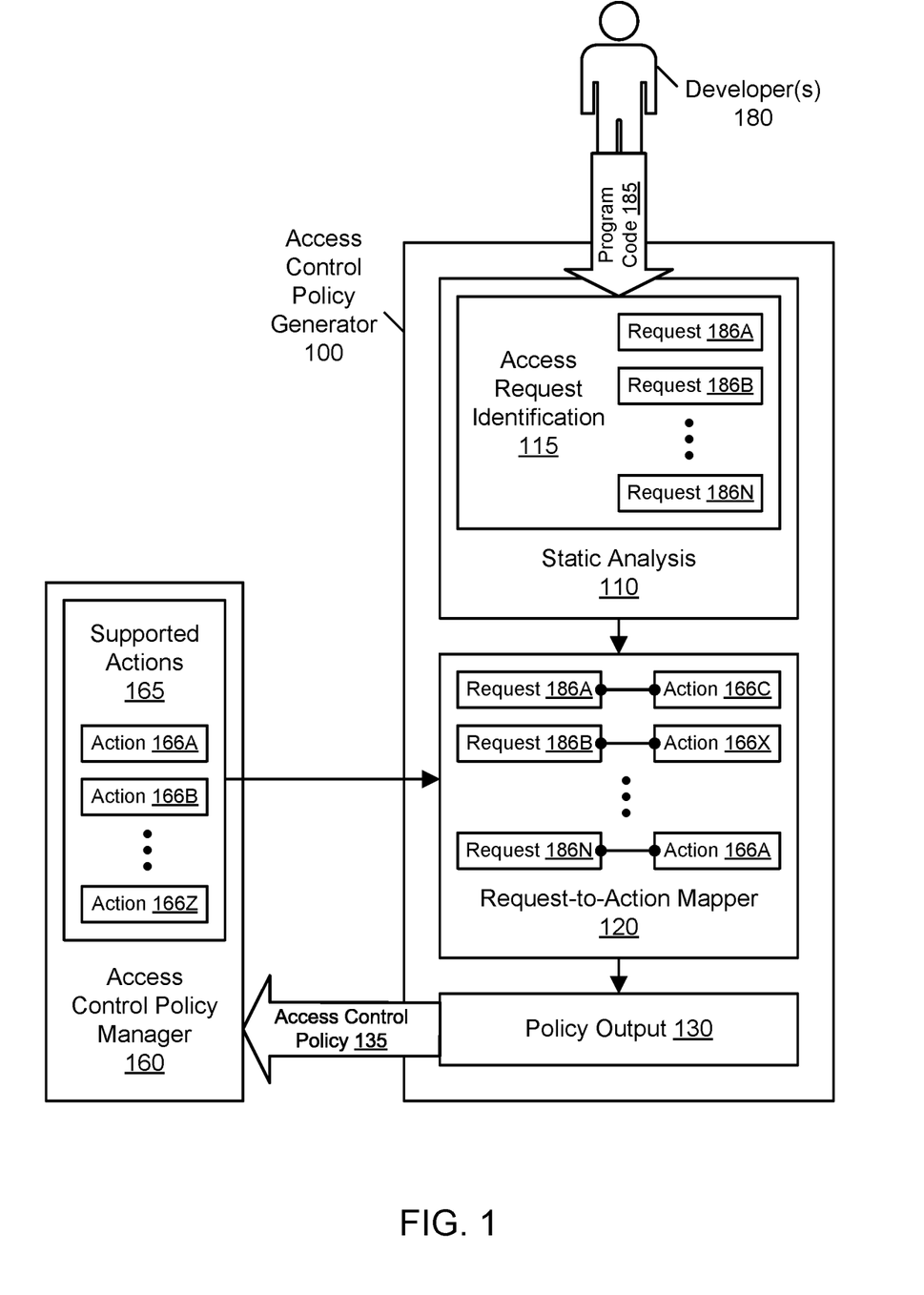
FIG. 1 illustrates an example system environment for generating access control policies using static analysis, according to some embodiments.

FIG. 1 illustrates an example system environment for generating access control policies using static analysis, according to some embodiments. Various embodiments of an access control policy generator 100 may generate access control policies for applications, where the policies control access to various external components (e.g., services and resources). In one embodiment, the access control policy generator 100 may use automated techniques to analyze program code of software products and then generate appropriate access control policies based on the analysis. Software products may include executable program code such as applications, services, components of applications, components of services, and so on. The terms "application" and "service" may be used interchangeably herein. Program code 185 represents an example of program code for a software product. Program code 185 may be written and executed by an individual developer or team of developers 180. Program code 185 may represent a software product that is under development, e.g., such that the application is not configured to interact with users outside of a development team. The developer(s) 180 may operate one or more computing devices by which the program code 185 is submitted to the policy generator 100. The policy generator 100 may offer one or more application programming interfaces (APIs) or other programmatic interfaces which the developer(s) 180 may use to invoke the functionality of the policy generator.

The program code 185 may be designed for deployment to and execution within a distributed system in which various services and resources are potentially accessible via access requests according to access control policies. The distributed system may include a multi-tenant provider network in which multiple clients may potentially access services and pools of resources. In one embodiment, an access control policy manager 160 associated with the provider network may manage access control policies that dictate which users can access which services and resources and the circumstances under which those users can access the services and resources. Access control policies may include or determine permissions or privileges with respect to particular services and resources. An owner of a service or resource may grant a user (or user group) access to the service or resource in order for the user to perform one or more actions while ensuring the security of the services or resource. In order to manage user privileges, a service or resource owner may delegate authority to access a given service or resource in a multiplicity of different ways to allow varying levels of access to the resource according to resource access policies. A principal (or set of principals) that are authorized by the delegation of authority to access the given service or resource may be referred to herein as an authorized delegate.

The access control policy generator 100 may implement automated techniques to generate access control policies using static analysis 110 of program code. Using the static analysis 110, the program code 185 for an application, service, or other software product may be analyzed prior to execution of that code. Using the static analysis 110, the program code 185 for an application, service, or other software product may be analyzed prior to deployment of that code to a distributed system such as a cloud-based, multi-tenant provider network. Without necessarily executing the corresponding application, the static analysis 110 may identify access requests to external components (e.g., other software products, services, and/or resources) in the program code 185. For example, the static analysis 110 may perform access request identification 115 to discover requests 186A and 186B through 186N. Access requests 186A-186N may represent service calls in the program code 185 to individual services and/or resources of a multi-tenant provider network. Access requests 186A-186N may represent calls in the program code 185 to individual APIs of a multi-tenant provider network. Access requests 186A-186N may represent requests in the program code 185 for services and/or resources of a multi-tenant provider network to perform various actions on behalf of the application. For example, access request 186A may represent a call to a PutObject API to store an object in a storage bucket offered by a particular internet-accessible storage service. The access requests 186A-186N may include parameter names. The access requests 186A-186N may include parameter values.

The static analysis 110 may be supported for one or more programming languages. In some embodiments, the static analysis 110 may convert the program code 185 to an intermediate representation that eliminates at least some of the business logic of the original code, and the access requests may be identified in the intermediate representation. In some embodiments, a variety of different programming languages may be converted to the same format of intermediate representation. The intermediate representation may be presented to the developer(s) 180 for review, e.g., for debugging purposes.

To automatically generate an access control policy 135 for the application based (at least in part) on the static analysis 110, the access control policy generator 100 may include a request-to-action mapper 120 to automatically map the access requests 186A-186N to actions that are known and supported by the access control policy manager 160. The policy manager 160 may be configured to allow a set of supported actions 165 such as actions 166A and 166B through 166Z. In some embodiments, the policy manager 160 may support thousands of different actions that can be used to control hundreds of different types of resources. For example, one of the known actions 166C may represent putting an object in a storage bucket offered by a particular internet-accessible storage service. The access control policy generator 100 may identify a PutObject service call 186A to store an object using the storage service and then map that service call to the PutObject action 166C. Using a component for policy output 130, the access control policy generator 100 may then automatically generate an access control policy 135 for the program code 185 that represents permission for the corresponding application (or user role associated with the application) to perform the PutObject action. Similarly, the request-to-action mapper 120 may map request 186B to action 166X, request 186N to action 166A, and so on. The mapped actions 166X and 166A may be included or referenced in the policy 135 with sufficient privileges for the application (or user role associated with the application) to perform those actions.

In some embodiments, a single request may be mapped to more than one action and may thus be associated with more than one permission in the policy 135. For example, if the PutObject request 186A seeks to store an object using encryption, that request may be mapped to permissions for both the PutObject API and an encryption API in the access control policy 135. Thus permissions may be included in the policy 135 for delegated calls that services may make on behalf of the application. In some embodiments, the static analysis 110 may identify annotations in the program code 185 that are relevant to generating the policy 135. For example, if an annotation indicates that a resource is to be stored in an encrypted manner, then the resulting policy 135 may include permissions for the encryption service as well as for the storage service.

In some embodiments, the mapping of some requests to actions may not be straightforward, and the automated mapper 120 may simplify what could otherwise be a time-consuming manual task. For example, user documentation may state that an API named ListBuckets may be used by the storage service to return a list of all storage buckets for a given account. However, the corresponding action known and supported by the policy manager 160 may actually be named ListAllMyBuckets. The request-to-action mapper 120 may correctly identify the correspondence between a ListBuckets API request and the ListAllMyBuckets action, such that the resulting access control policy 135 includes proper permissions for the ListAllMyBuckets action. As another example, user documentation may refer to an action supposedly named HeadObject that returns metadata about an object stored by a storage service. However, the action may actually be classified as a read and may be associated with a different GetObject action. Again, the request-to-action mapper 120 may correctly identify the correspondence between a HeadObject API request and the GetObject action, such that the resulting access control policy 135 includes proper permissions for the GetObject action.

In some embodiments, the mapper 120 may use the parameter names in requests to map requests to actions. In some embodiments, the static analysis 110 may identify state changes for resources in the program code 185 in order to perform the mapping of requests to appropriate actions. In some embodiments, the static analysis 110 may track the flow of data through the program code 185 in order to perform the mapping of requests to appropriate actions. For example, if the static analysis 110 determines that a storage bucket is encrypted at one point in the program code 185, the mapper 120 may determine that subsequent requests to access that bucket should be mapped to encryption-related actions as well as actions to read, write, or delete.

By analyzing all of the program code 185, the static analysis 110 may discover access requests in infrequently executed code paths. By contrast, automated runtime analysis or manual analysis may fail to catch such rare service calls. If an access control policy lacks sufficient privileges to perform infrequently encountered actions, failures may occur at runtime. By performing a thorough analysis of the program code 185, the policy generator 100 may produce an access control policy 135 that includes permissions for frequently requested actions as well as less frequently requested actions. The resulting policy 135 may adhere to a principle of least privilege such that the application corresponding to the program code 185 is permitted only to perform the actions corresponding to the requests 186A-186N identified in the code and not necessarily permitted to perform other actions. By automatically generating application permissions using static analysis, developers and policy managers need not spend time and resources to manually write access control policies. Policies may be scoped appropriately for the actual needs of applications, and application development need not be delayed by a time-consuming trial-and-error process or while waiting for external teams to write or update policies.

In some embodiments, the policy generator 100 may describe the policy 135 or aspects of the policy to the developer(s) 180. In some embodiments, the policy generator 100 may provide an explanation for why particular aspects of the policy 135 were generated, e.g., which calls or which code paths caused which permissions to be added. In some embodiments, the policy generator 100 may report one or more recommendations about modifying the program code 185 such that particular permissions need not be included in the access control policy. The policy generator 100 may provide recommendations about modifying the code 185 to "scope down" access privileges while achieving the same results of the business logic of the program code. In some embodiments, the access control policy 135 may be used to determine test criteria for the application. For example, one or more tests may be added to a test suite and performed such that all of the actions included in the policy 135 are tested.

Figure 7:
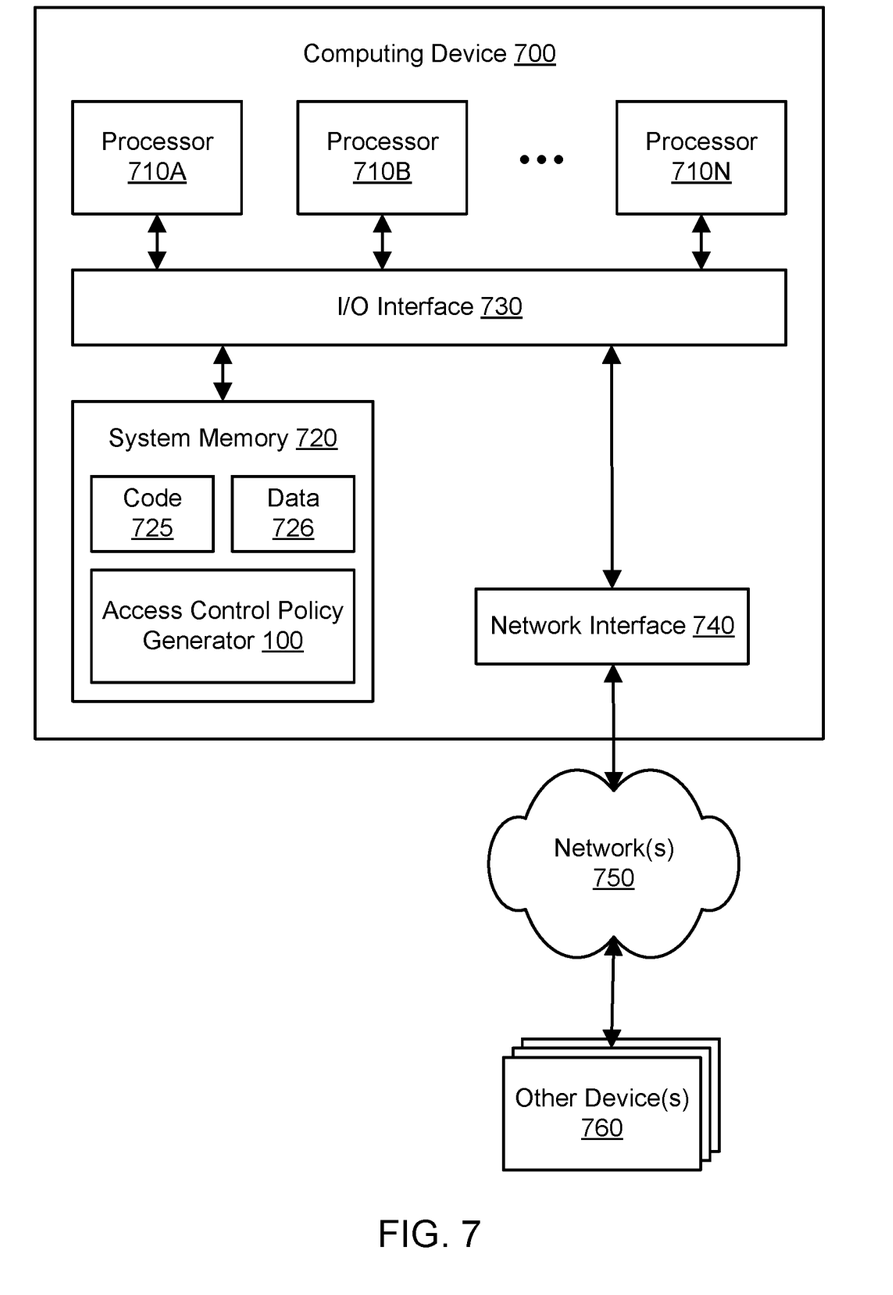
FIG. 7 illustrates an example computing device that may be used in some embodiments.

The access control policy generator 100 and policy manager 160 may be implemented using any suitable number and configuration of computing devices, any of which may be implemented by the example computing device 700 illustrated in FIG. 7. The computing devices may be located in any suitable number of data centers or geographical locations. In various embodiments, at least some of the functionality of the access control policy generator 100 may be provided by the same computing device or by different computing devices. If any of the components of the access control policy generator 100 are implemented using different computing devices, then the components and their respective computing devices may be communicatively coupled, e.g., via one or more networks. Each of the components of the access control policy generator 100 may represent any combination of software and hardware usable to perform their respective functions, as discussed as follows. Operations implemented by the access control policy generator 100 may be performed automatically, e.g., without a need for user initiation or user intervention after an initial configuration stage, and programmatically, e.g., by execution of program instructions on at least one computing device. It is contemplated that the access control policy generator 100 may include additional components not shown, fewer components than shown, or different combinations, configurations, or quantities of the components shown.

Figure 2:
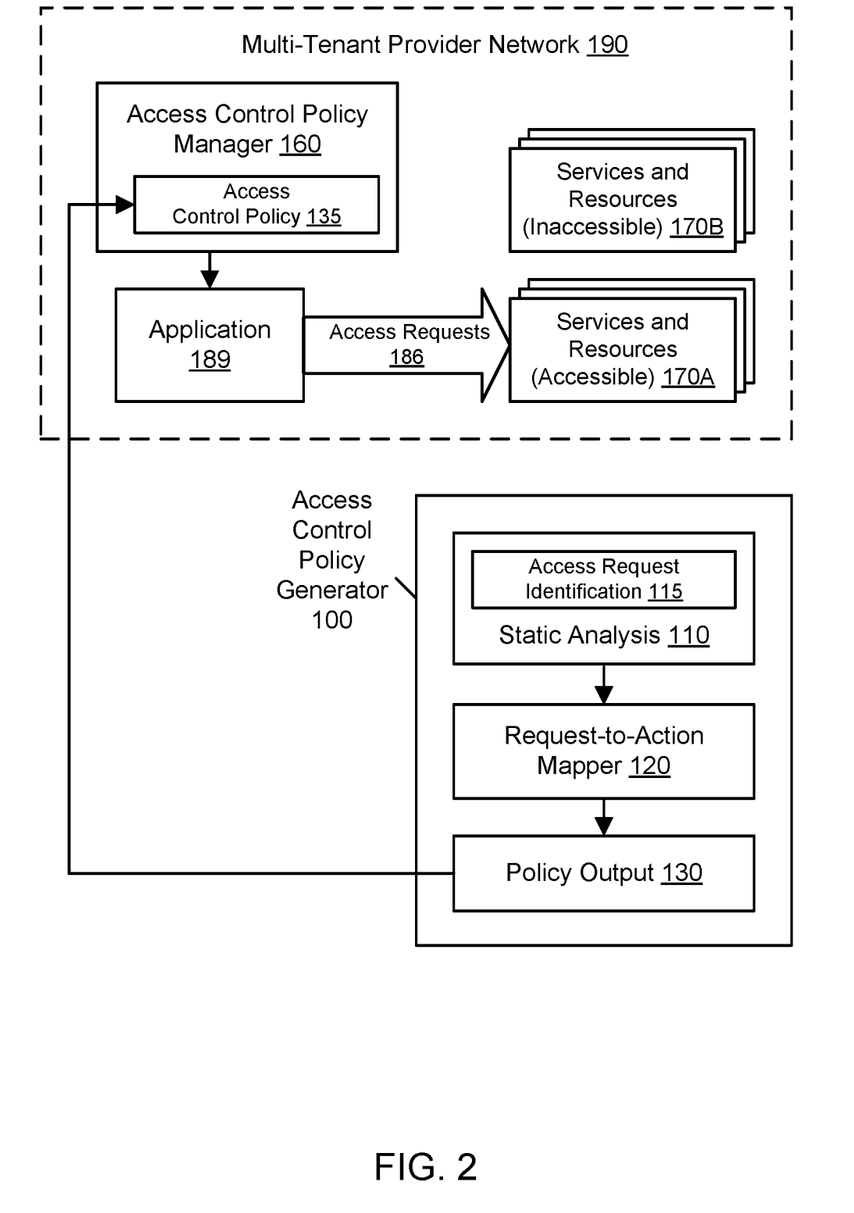
FIG. 2 illustrates further aspects of the example system environment for generating access control policies using static analysis, including deployment of an application using an access control policy generated using static analysis, according to some embodiments.

FIG. 2 illustrates further aspects of the example system environment for generating access control policies using static analysis, including deployment of an application using an access control policy generated using static analysis, according to some embodiments. An application 189 may be generated based (at least in part) on the program code 185, e.g., using compilation of the code to produce an executable version for a particular platform. In some embodiments, the application 189 may be implemented (at least in part) using a serverless compute service to which portions of the program code 185 are provided. In some embodiments, the application 189 may be deployed to a development environment, test environment, or pre-production environment that is isolated from real-world traffic (e.g., requests or other input from clients). The development environment may include historical or synthetic traffic so that the application 189 can be tested. In some embodiments, the application 189 may be deployed to a production environment that is not isolated from real-world traffic (e.g., requests or other input from clients).

The application 189 may be deployed to and executed within a distributed system in which other services and resources 170A-170B are potentially accessible via access requests according to access control policies. For example, the distributed system to which the application 189 is deployed may represent a multi-tenant provider network 190. Resources accessible via access control policies may include compute instances, storage resources, database resources, and so on. Services accessible via access control policies may include software products that perform various tasks in response to requests from clients, including other services. In some embodiments, the services may offer access to the resources. For example, the multi-tenant provider network 190 may offer a virtual computing service that provisions compute instances from pools of available resources and then permits clients to operate those instances. As another example, the multi-tenant provider network 190 may offer a cloud-based storage service that reserves storage resources from pools of available resources and then permits clients to read from and write to those storage resources. Services and resources 170A-170B may include application programming interfaces (APIs) through which the application 189 may request actions to be performed.

The access control policy 135 may be attached to a role managed by the policy manager 160 or another identity and access management service. The role may be associated with one or more users or user groups that execute the application 189. The role may be used by the application 189 during execution in the provider network 190. In one embodiment, the policy 135 may be automatically attached to the role associated with the developers 180 or other team that owns the application 189. In one embodiment, the policy 135 may be attached to the role based (at least in part) on user input. For example, a description of the policy 135 may be provided to a developer 180 or other user associated with the application 189, and user input may be solicited to approve or deny the auto-generated policy 135 for the application. In some embodiments, the policy 135 may be provided to the developer(s) 180 and may then be manually added to the appropriate role managed by the policy manager 160.

The access control policy 135 generated based (at least in part) on static analysis may adhere to the principle of least privilege. The services and resources may include one set 170A (including one or more services and/or resources) and another set 170B (including one or more services and/or resources), and the policy 135 may permit access to the one set of services and resources 170A but not to the other set of services and resources 170B. Accordingly, using the policy 135, the application 189 may issue requests 186 to the accessible services and resources 170A. However, the policy 135 may prevent the application 189 from issuing requests to the inaccessible services and resources 170B. Thus, as shown in the example of FIG. 2, the access control policy 135 auto-generated using static analysis 110 may be used to restrict the access of the application 189 to particular services and resources.

The access control policy generator 100, application 189, policy manager 160, and services and resources 170A-170B may be implemented in a service-oriented system in which multiple services collaborate to perform complex tasks according to a service-oriented architecture. A service (such as one of the services 170A-170B) may be implemented using a plurality of different instances that are distributed throughout one or more networks, and each instance may offer access to the functionality of the corresponding service to various clients. In such an environment, the access control policy generator 100 may offer its functionality as service to multiple clients. It is contemplated that any suitable number and configuration of clients may interact with the access control policy generator 100. To enable clients to invoke its functionality, the access control policy generator 100 may expose any suitable interface(s), such as one or more APIs or other programmatic interfaces and/or graphical user interfaces (GUIs). In one embodiment, the functionality of the access control policy generator 100 may be offered to clients in exchange for fees.

Components shown in FIG. 1 and FIG. 2 may convey network-based service requests and other data to each other via one or more networks. In various embodiments, the network(s) may encompass any suitable combination of networking hardware and protocols necessary to establish network-based communications, e.g., between the provider network 190 and the access control policy generator 100. For example, the network(s) may generally encompass the various telecommunications networks and service providers that collectively implement the Internet. The network(s) may also include private networks such as local area networks (LANs) or wide area networks (WANs) as well as public or private wireless networks. In some embodiments, any of the components shown in FIG. 1 and FIG. 2 may be respectively provisioned within enterprises having their own internal networks. In such an embodiment, the network(s)

may include the hardware (e.g., modems, routers, switches, load balancers, proxy servers, etc.) and software (e.g., protocol stacks, accounting software, firewall/security software, etc.) necessary to establish a networking link between one component and the Internet as well as between the Internet and another component. It is noted that in some embodiments, components may communicate using a private network rather than the public Internet.

In one embodiment, the services and resources 170A-170B may be implemented using resources of the provider network 190. In some embodiments, aspects of the access control policy generator 100, application 189, and/or policy manager 160 may also be implemented using resources of the provider network 190. The provider network 190 may represent a network set up by an entity such as a business entity or a public-sector organization to provide one or more services (such as various types of network-accessible computing or storage) accessible via the Internet and/or other networks to a distributed set of clients. The provider network 190 may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network 190 may be under the control of multiple clients (or tenants) simultaneously, the provider network may be said to offer multi-tenancy and may be termed a multi-tenant provider network. The provider network 190 may be hosted "in the cloud" and may be termed a cloud-based or cloud-hosted provider network.

In some embodiments, an operator of the provider network 190 may implement a flexible set of resource reservation, control, and access interfaces for their clients. For example, a resource manager may implement a programmatic resource reservation interface (e.g., via a web site or a set of web pages) that allows clients (potentially including other components within the provider network 190) to learn about, select, purchase access to, and/or reserve compute instances offered by the provider network 190. Such an interface may include capabilities to allow browsing of a resource catalog and provide details and specifications of the different types or sizes of resources supported, the different reservation types or modes supported, pricing models, and so on.

Figure 3:
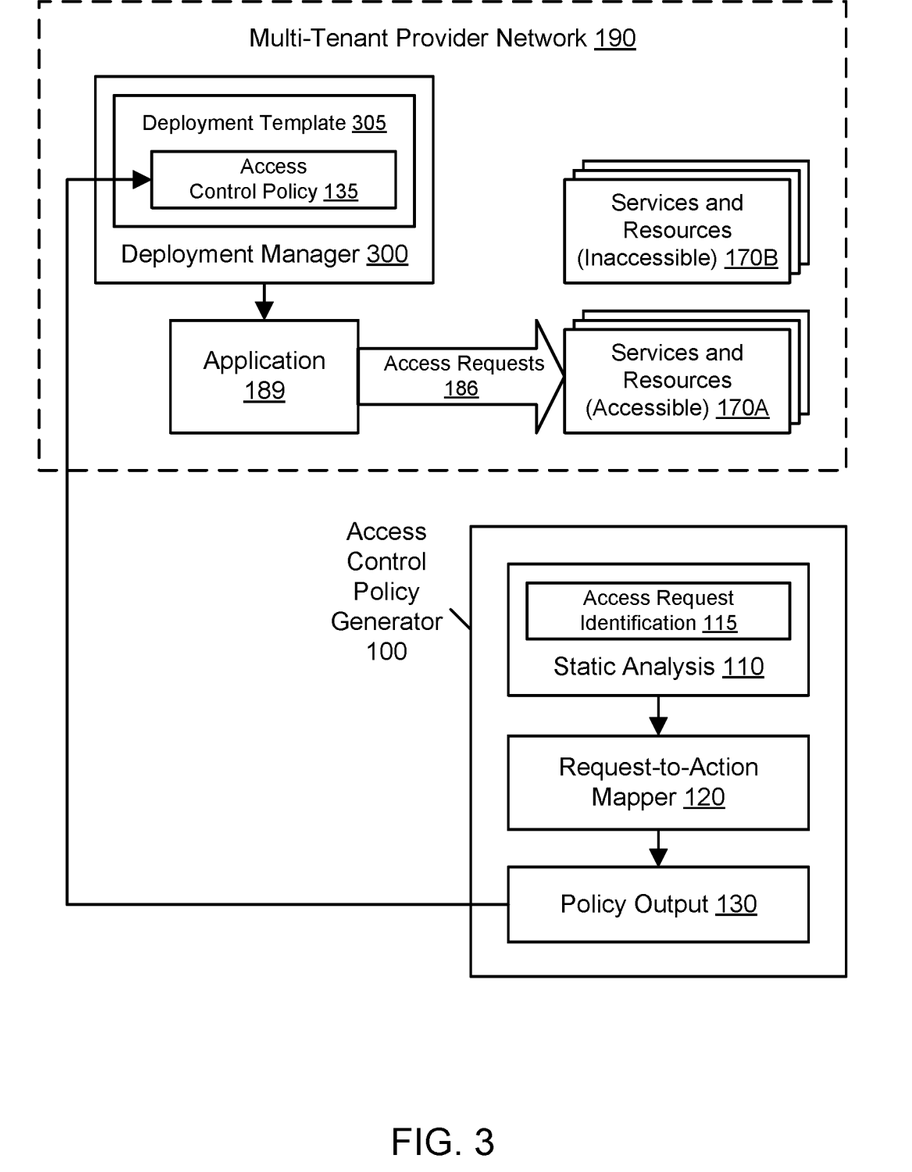
FIG. 3 illustrates further aspects of the example system environment for generating access control policies using static analysis, including deployment of an application using a deployment template that includes an access control policy generated using static analysis, according to some embodiments.

FIG. 3 illustrates further aspects of the example system environment for generating access control policies using static analysis, including deployment of an application using a deployment template that includes an access control policy generated using static analysis, according to some embodiments. The application 189 may be deployed to the provider network 190 using one or more computing resources (e.g., virtual compute instances) provided by pools of resources of the provider network. A deployment manager 300 of the provider network 190 may manage the deployment of the application 189 according to a deployment template 305. For example, the deployment manager 300 may reserve and deploy a set of compute instances for execution of the application 189 according to the deployment template 305. In some embodiments, the access control policy 135 generated based (at least in part) on static analysis 110 may be added to the deployment template 305 associated with the application 189. The application 189 may then be executed using the access control policy 135 to successfully perform the access requests 186 to the services and resources 170A. In some embodiments, the access control policy 135 may be added to the deployment template 305 automatically, e.g., without the need for explicit approval by the developer(s) 180. In some embodiments, the access control policy 135 may be added to the deployment template 305 by the policy generator 100 based (at least in part) on approval by the developer(s) 180, e.g., as solicited by the policy generator 100. In some embodiments, the access control policy 135 may be added to the deployment template 305 manually by the developer(s) 180.

Figure 4:
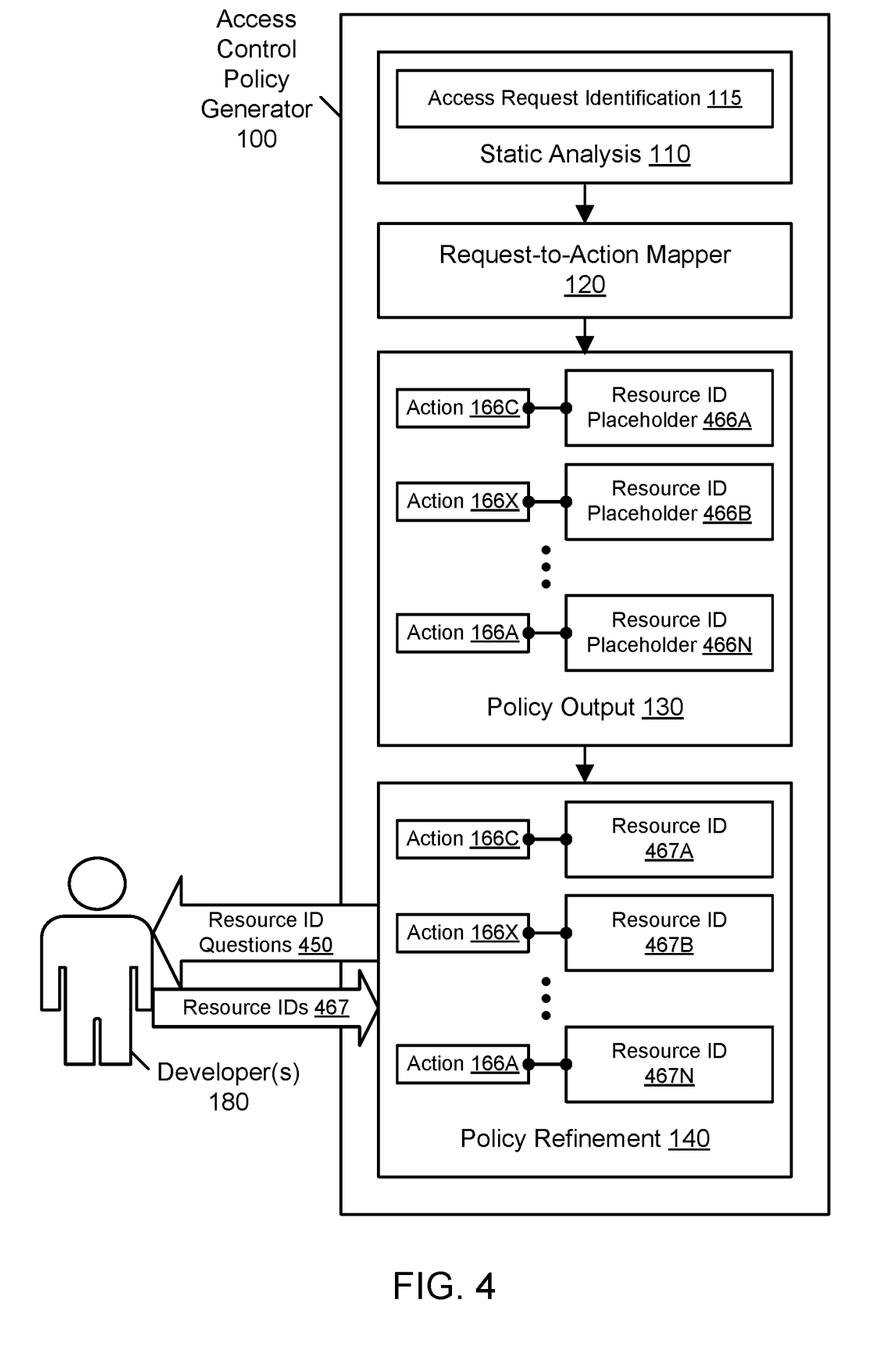
FIG. 4 illustrates further aspects of the example system environment for generating access control policies using static analysis, including refinement of an access control policy to replace resource ID placeholders with resource IDs, according to some embodiments.

FIG. 4 illustrates further aspects of the example system environment for generating access control policies using static analysis, including refinement of an access control policy to replace resource ID placeholders with resource IDs, according to some embodiments. The access control policy generator 100 may include an interface that allows the generator to interact with one or more users, e.g., one or more developers 180. The interface may include a graphical user interface (GUI), a command-line interface (CLI), an application programming interface (API), and/or other suitable channels for providing information to clients and receiving input from clients. In some embodiments, an auto-generated access control policy 135 may be attached to a role used by the application 189 based (at least in part) on input obtained from the developer(s) 180 using a user interface. For example, a description of the policy 135 may be provided to a developer 180 associated with the application program code 185, and user input may be solicited to approve or deny a recommended policy for the corresponding application.

In some circumstances, access control policies may include placeholders for resource identifiers, and the placeholders may be completed automatically based (at least in part) on user input solicited by the access control policy generator 100 or completed manually by developer(s) 180. Resource identifiers (IDs) associated with some actions may be passed to the application 189 at runtime and may not be indicated in the program code 185. Rather than indicating specific resource IDs for particular actions, the auto-generated policy may include placeholder values. For example, the auto-generated policy 135 may indicate a resource ID placeholder 466A for action 166C, a resource ID placeholder 466B for action 166X, and a resource ID placeholder 466N for action 166A.

In some embodiments, the placeholder values 466A-466N may be replaced by real resource IDs manually by developers. In some embodiments, the placeholder values 466A-466N may be replaced by real resource IDs automatically by the policy generator 100 according to annotations in the program code 185. In some embodiments, the placeholder values 466A-466N may be replaced by real resource IDs by the policy generator 100 according to additional input from the developer(s) 180. The policy generator 100 may use an interactive process such as a "wizard" to refine policies based on user input. The policy generator 100 may include a component for policy refinement 140 that solicits additional input from developers 180, e.g., by asking resource ID questions 450. The resource ID questions 450 may indicate the actions associated with the placeholder values 466A-466N, the corresponding access requests or code paths in which those requests were found, and/or other suitable information usable for policy refinement. In some embodiments, the refinement 140 may add one or more actions to an access control policy based (at least in part) on user input solicited by the policy generator 100. For example, the resource ID questions 450 may ask whether a storage resource is encrypted; if so, the policy generator 100 may add an encryption-related action for a request to access that resource. The resource ID questions 450 may be presented in a user interface to the developer(s) 180. In response, the developer(s) 180 may provide real-world resource IDs 467 which can be used to refine the policy 135. For example, the refined policy 135 may indicate a resource ID 467A for action 166C, a resource ID 467B for action 166X, and a resource ID 467N for action 166A.

Figure 5:
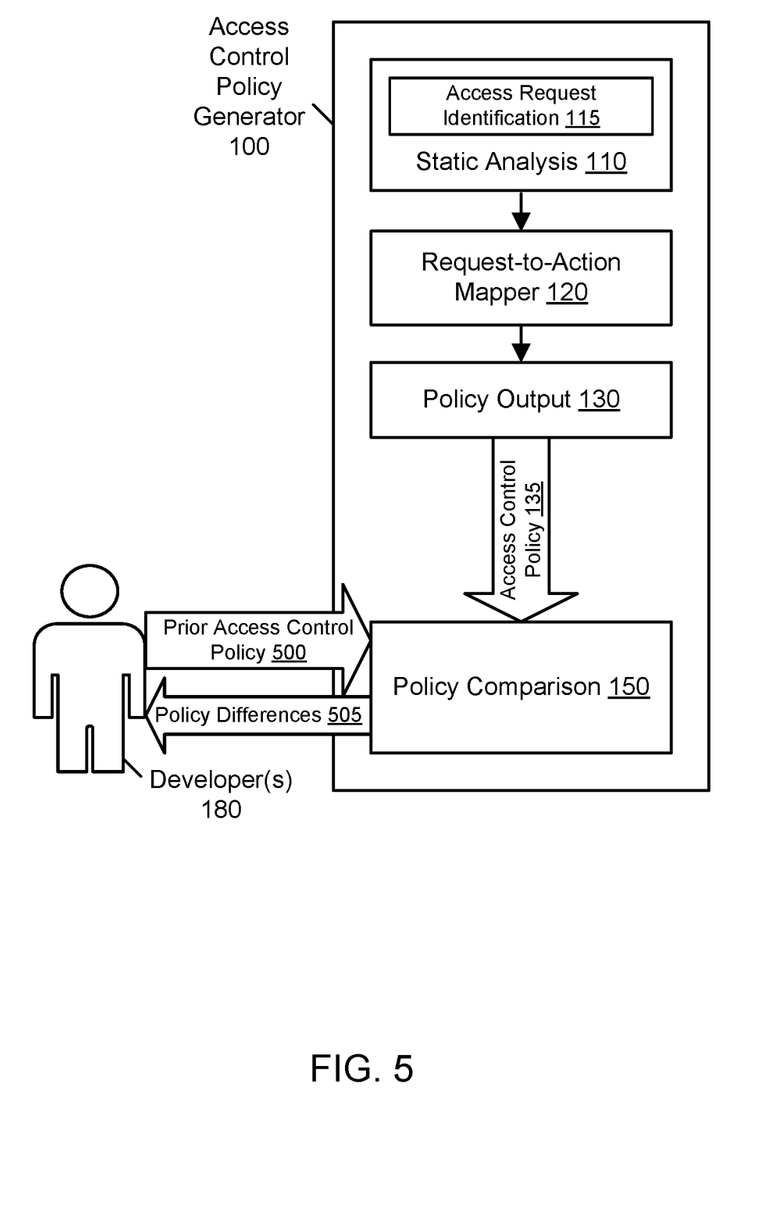
FIG. 5 illustrates further aspects of the example system environment for generating access control policies using static analysis, including performing a comparison of an access control policy generated using static analysis and a prior access control policy, according to some embodiments.

FIG. 5 illustrates further aspects of the example system environment for generating access control policies using static analysis, including performing a comparison of an access control policy generated using static analysis and another access control policy, according to some embodiments. In some embodiments, the policy generator 100 may include a component for policy comparison 150. The policy comparison 150 may compare an auto-generated access control policy 135 with another access control policy 500 for the application 189 or corresponding program code 185. The access control policy 500 may represent a prior policy that was generated manually by the developers(s) 180. The prior policy 500 may have been used in a production environment already. The prior policy 500 may be associated with an earlier version of the application 189 or corresponding program code 185 than the version that was statically analyzed to produce the auto-generated policy 135. The policy comparison 150 may identify and report policy differences 500 between the access control policy 500 and the auto-generated access control policy 135. For example, the policy comparison 150 may determine that the policy 500 includes one or more overly broad permissions in comparison to the auto-generated policy 135. As another example, the policy comparison 150 may determine that the policy 500 includes one or more overly narrow permissions in comparison to the auto-generated policy 135. Based (at least in part) on the policy comparison 150, the policy generator 100 may report one or more recommendations about the application 189 or corresponding program code 185.

In some embodiments, the access control policy 135 may be provided as a security review artifact for use by developer(s) 180 or security reviewers. For example, if a change to the program code 185 results in an updated policy that includes an action to delete an entire account or perform another destructive action, then such a change may be flagged for review. To facilitate such a review, the policy generator 100 may provide links from portions of the policy (e.g., requests and/or actions) to corresponding portions of the program code 185.

Figure 6:
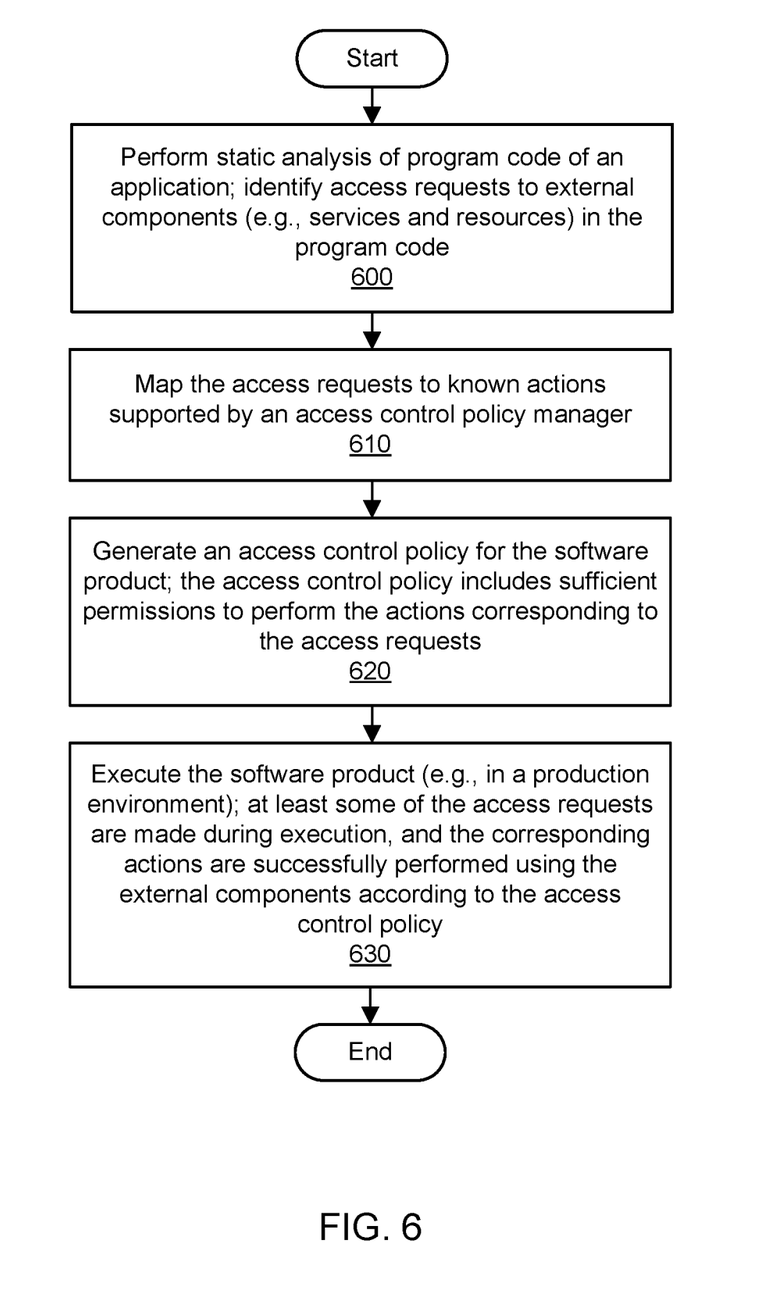
FIG. 6 is a flowchart illustrating a method for generating access control policies using static analysis, according to some embodiments.

FIG. 6 is a flowchart illustrating a method for generating access control policies using static analysis, according to some embodiments. As shown in 600, static analysis of program code may be performed. Using the static analysis, the program code for an application, service, or other software product may be analyzed prior to deployment of that code to a distributed system such as a cloud-based, multi-tenant provider network. Without necessarily executing the corresponding application, the static analysis may identify access requests to external components (e.g., other software products, services, and/or resources) in the program code. The access requests may represent service calls in the program code to individual services and/or resources of a multi-tenant provider network, calls in the program code to individual APIs of a multi-tenant provider network, and/or requests in the program code for services and/or resources of a multi-tenant provider network to perform various actions on behalf of the application. For example, one of the access requests may represent a call to a PutObject API to store an object in a storage bucket offered by a particular internet-accessible storage service.

As shown in 610, the requests may be mapped to known actions supported by an access control policy manager. The policy manager may be configured to allow a set of supported actions in the provider network. The actions may be associated with the external components. For example, one of the known actions may represent putting an object in a storage bucket offered by a particular internet-accessible storage service. The mapping may identify a PutObject service call to store an object using the storage service and then map that service call to the PutObject action.

As shown in 620, an access control policy may be generated automatically for the software product. The policy may be generated based (at least in part) on the static analysis shown in 600 and/or the mapping shown in 610. The policy may include sufficient permissions to perform the actions corresponding to the access requests. For example, the access control policy for the program code may include permission for the corresponding application (or user role associated with the application) to perform the PutObject action. In some embodiments, access control policies may include placeholders for resource identifiers associated with various actions. In some embodiments, the placeholders may be completed automatically based (at least in part) on user input solicited from the developers or completed manually by the developers.

As shown in 630, the software product may be executed using the access control policy, e.g., in a production environment. During the execution, at least some of the access requests may be made by the software product; however, some of the requests may be made more frequently than others due to differences in how often some code paths are run. By performing a thorough analysis of the program code, the static analysis may produce an access control policy that includes permissions for frequently requested actions as well as less frequently requested actions. According to the access control policy as enforced by an access control manager, the corresponding actions may be performed successfully using the external components. For example, the PutObject action may be performed to store an object in a specified bucket of a storage service. The access control policy may adhere to a principle of least privilege such that the software product is permitted only to perform the actions corresponding to the requests identified in the code and not necessarily permitted to perform other actions with external components.

Illustrative Computer System

In at least some embodiments, a computer system that implements a portion or all of one or more of the technologies described herein may include a computer system that includes or is configured to access one or more computer-readable media. FIG. 7 illustrates such a computing device 700. In the illustrated embodiment, computing device 700 includes one or more processors 710A-710N coupled to a system memory 720 via an input/output (I/O) interface 730.

Computing device 700 further includes a network interface 740 coupled to I/O interface 730.

In various embodiments, computing device 700 may be a uniprocessor system including one processor or a multiprocessor system including several processors 710A-710N (e.g., two, four, eight, or another suitable number). Processors 710A-710N may include any suitable processors capable of executing instructions. For example, in various embodiments, processors 710A-710N may be processors implementing any of a variety of instruction set architectures (ISAs), such as the x86, PowerPC, SPARC, or MIPS ISAs, or any other suitable ISA. In multiprocessor systems, each of processors 710A-710N may commonly, but not necessarily, implement the same ISA.

System memory 720 may be configured to store program instructions and data accessible by processor(s) 710A-710N. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 720 as code (i.e., program instructions) 725 and data 726. In the illustrated embodiment, system memory 720 also stores program code and data that implement aspects of the access control policy generator 100 discussed above.

In one embodiment, I/O interface 730 may be configured to coordinate I/O traffic between processors 710A-710N, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processors 710A-710N). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processors 710A-710N.

Network interface 740 may be configured to allow data to be exchanged between computing device 700 and other devices 760 attached to a network or networks 750. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-readable (i.e., computer-accessible) medium configured to store program instructions and data as described above for implementing embodiments of the corresponding methods and apparatus. For example, system memory 720 may store program code and data associated with the access control policy generator 100. In some embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 700 via I/O interface 730. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 700 as system memory 720 or another type of memory. Further, a computer-readable medium may include transmission media or signals such as electrical, electromagnetic, or digital signals, conveyed via a communication medium such as a network and/or a wireless link, such as may be implemented via network interface 740. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
an access control policy generator comprising one or more processors and one or more memories to store computer-executable instructions that, when executed, cause the one or more processors to:
perform static analysis of program code of an application, wherein the static analysis identifies a plurality of access requests in the program code, and wherein the access requests comprise calls to a plurality of services implemented in a provider network;
determine a mapping of the plurality of access requests identified in the program code to a plurality of actions associated with but distinct from the access requests, wherein the plurality of actions are selected from a plurality of known actions supported by an access control policy manager of the provider network, and wherein the plurality of actions are associated with the plurality of services; and
generate, based at least in part on the determined mapping, a new access control policy associated with the application, wherein the new access control policy comprises a plurality of permissions with respect to the plurality of services, and wherein the new access control policy permits the application to access the plurality of services using the access control policy manager during execution of the application in the provider network.

2. The system as recited in claim 1, wherein the new access control policy comprises one or more placeholder values for one or more resources associated with the one or more actions, wherein the one or more resources are managed by the plurality of services.

3. The system as recited in claim 2, wherein the one or more memories store additional computer-executable instructions that, when executed, cause the one or more processors to:
solicit user input associated with the one or more placeholder values, wherein the user input comprises one or more resource identifiers; and
modify the new access control policy to replace at least some of the one or more placeholder values with the one or more resource identifiers.

4. The system as recited in claim 1, wherein the new access control policy is generated without executing the application and without using logs produced by the application.

5. A method, comprising:
performing, by an access control policy generator, static analysis of program code of a software product, wherein the static analysis identifies one or more calls to one or more external components in the program code;
determining, by the access control policy generator, a mapping of the one or more calls identified in the program code to one or more actions associated with but distinct from the access requests, wherein the one or more actions are selected from a plurality of known actions supported by an access control policy manager; and
generating, by the access control policy generator and based at least in part on the determined mapping, a new access control policy associated with the software product, wherein the new access control policy comprises one or more permissions with respect to the one or more external components, and wherein the new access control policy permits the software product to access the one or more external components using the access control policy manager during execution of the software product.

6. The method as recited in claim 5, wherein the new access control policy comprises one or more placeholder values for one or more resources associated with the one or more actions.

7. The method as recited in claim 6, further comprising:
soliciting, by the access control policy generator, user input associated with the one or more placeholder values, wherein the user input comprises one or more resource identifiers; and
modifying, by the access control policy generator, the new access control policy to replace at least some of the one or more placeholder values with the one or more resource identifiers.

8. The method as recited in claim 5, wherein the one or more external components represent one or more additional software products implemented in a provider network, wherein the one or more actions are associated with the one or more additional software products, wherein the access control policy manager is implemented in the provider network, and wherein the new access control policy permits the software product to access the one or more additional software products using the access control policy manager during execution of the software product in the provider network.

9. The method as recited in claim 5, further comprising:
performing, by the access control policy generator, a comparison between the new access control policy generated by the access control policy generator and a prior access control policy associated with the software product, wherein the comparison determines that the prior access control policy represents an overly broad set of permissions.

10. The method as recited in claim 5, further comprising:
soliciting, by the access control policy generator, user input associated with an individual one of the one or more calls; and
modifying, by the access control policy generator, the new access control policy to map the individual one of the one or more calls to an additional one or more actions based at least in part on the user input.

11. The method as recited in claim 5, wherein the new access control policy is generated without executing the software product and without using logs produced by the software product.

12. The method as recited in claim 5, wherein an individual one of the one or more calls is mapped to a plurality of the actions.

13. One or more non-transitory computer-readable storage media storing program instructions that, when executed on or across one or more processors, perform:
- performing static analysis of program code of a software product, wherein the static analysis identifies a plurality of access requests in the program code, and wherein the access requests comprise calls to a plurality of additional software products of a provider network;
- determining a mapping of the plurality of access requests identified in the program code to a plurality of actions associated with but distinct from the access requests, wherein the plurality of actions are selected from a plurality of known actions supported by an access control policy manager of the provider network; and
- generating, based at least in part on the determined mapping, a new access control policy associated with the software product, wherein the new access control policy comprises a plurality of permissions with respect to the plurality of actions, and wherein the new access control policy permits the software product to perform the plurality of actions to access the plurality of additional software products using the access control policy manager during execution of the software product.

14. The one or more non-transitory computer-readable storage media as recited in claim 13, wherein the new access control policy comprises one or more placeholder values for one or more resources associated with the one or more actions.

15. The one or more non-transitory computer-readable storage media as recited in claim 14, further comprising additional program instructions that, when executed on or across the one or more processors, perform:
- soliciting user input associated with the one or more placeholder values, wherein the user input comprises one or more resource identifiers; and
- modifying the new access control policy to replace at least some of the one or more placeholder values with the one or more resource identifiers.

16. The one or more non-transitory computer-readable storage media as recited in claim 13, further comprising additional program instructions that, when executed on or across the one or more processors, perform:
- performing a comparison between the new access control policy and a prior access control policy associated with the software product, wherein the comparison determines that the prior access control policy represents an overly narrow set of permissions.

17. The one or more non-transitory computer-readable storage media as recited in claim 13, further comprising additional program instructions that, when executed on or across the one or more processors, perform:
- modifying a deployment template associated with the software product, wherein the deployment template is modified to include the new access control policy, and wherein the deployment template is usable to configure one or more computing resources to execute the software product in the provider network.

18. The one or more non-transitory computer-readable storage media as recited in claim 13, wherein one or more of the permissions is generated in the new access control policy based at least in part on one or more annotations in the program code.

19. The one or more non-transitory computer-readable storage media as recited in claim 13, wherein the static analysis detects one or more of the access requests in one or more code paths of the program code that are less frequently executed in a production environment than others of the access requests.

20. The one or more non-transitory computer-readable storage media as recited in claim 13, wherein an individual one of the access requests has a different name than a corresponding one of the actions.

\* \* \* \* \*